(12) United States Patent
A et al.

(10) Patent No.: US 10,278,112 B1
(45) Date of Patent: Apr. 30, 2019

(54) RESOLVING OUT-OF-BAND CONFIGURATION CHANGES TO HIGH-LEVEL SERVICE CONFIGURATION FOR MANAGED NETWORK DEVICES

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 80 days.

(21) Appl. No.: 15/396,300

(22) Filed: Dec. 30, 2016

(51) Int. Cl.
*H04W 40/24* (2009.01)
*H04W 74/00* (2009.01)

(52) U.S. Cl.
CPC ......... *H04W 40/24* (2013.01); *H04W 74/002* (2013.01)

(58) Field of Classification Search
CPC .............................. H04W 40/24; H04W 74/002
See application file for complete search history.

(56) References Cited

U.S. PATENT DOCUMENTS

| 7,804,832 | B2 * | 9/2010 | Andrews | H04L 12/4675 370/390 |
| 2016/0246582 | A1 * | 8/2016 | Benton | G06F 8/61 |

OTHER PUBLICATIONS

Harrington et al., "An Architecture for Describing Simple Network Management Protocol (SNMP) Management Frameworks," Network Working Group, RFC 3411, Dec. 2002, 64 pp.

Enns, "NETCONF Configuration Protocol," Network Working Group, RFC 4741, Dec. 2006, 99 pp.

Bjorklund, "Yang—A Data Modeling Language for the Network Configuration Protocol (NETCONF)," Internet Engineering Task Force (IETF), RFC 6020, Oct. 2010, 173 pp.

U.S. Appl. No. 15/198,657, by Juniper Networks, Inc., (Inventor: Jiang), filed Jun. 30, 2016.

U.S. Appl. No. 15/396,262, by Juniper Networks, Inc., (Inventors: Chandrasekhar et al.), filed Dec. 30, 2016.

"Recurrent Layers—Keras Documentation," Keras, accessed on Nov. 30, 2016, from https://keras.io/layers/recurrent/, 5 pp.

Sutskever, et al., "Sequence to Sequence Learning with Neural Networks," Proceeding NIPS'14 Proceedings of the 27th International Conference on Neural Information Processing Systems, Dec. 8-13, 2014; pp. 3104-3112.

* cited by examiner

*Primary Examiner* — Mohammad S Anwar
(74) *Attorney, Agent, or Firm* — Shumaker & Sieffert, P.A.

(57) ABSTRACT

In one example, a network management system (NMS) device manages a plurality of network devices. The NMS device includes one or more interfaces to communicatively couple the NMS device to the plurality of network devices, and a processor, implemented using circuitry, configured to determine that a low-level configuration of a first network device of the plurality of network devices has been changed by an out-of-band (OOB) change, translate the OOB change to a high-level configuration change, determine whether to apply the high-level configuration change to the plurality of network devices, and in response to determining to apply the high-level configuration change to the plurality of network devices, apply, via the one or more interfaces, the OOB change to low-level configurations of the plurality of network devices.

36 Claims, 5 Drawing Sheets

RESOLVING OUT-OF-BAND CONFIGURATION CHANGES TO HIGH-LEVEL SERVICE CONFIGURATION FOR MANAGED NETWORK DEVICES

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. In order to configure devices to perform the services, a user (such as an administrator) may write translation programs that translate high-level configuration instructions (e.g., instructions according to a network service model) to low-level configuration instructions (e.g., instructions according to a device configuration model). As part of configuration service support, the user/administrator may provide a service model and a mapping between the service model to a device configuration model.

In order to simplify the mapping definition for the user, NMS devices may be designed to provide the capability to define the mappings in a simple way. For example, some NMS devices provide the use of Velocity Templates and/or Extensible Stylesheet Language Transformations (XSLT). Such translators contain the translation or mapping logic from the high-level service model to the low-level device configuration model. Typically, a relatively small number of changes in the high-level service model impact a relatively large number of properties across device configurations. Different translators may be used when services are created, updated, and deleted from the high-level service model.

NMS devices allow defining of custom services on the fly. The services may spread across managed devices. There can be multiple levels of service abstractions, e.g., higher-level services, base service elements, and the like. Typical Service provider deployments contain higher-level services. There can be thousands of services running in the network. "Service provider Admins", sometimes, use command line interfaces (CLIs) and other tools to modify the configuration of a few services. These changes would need to be synched to Service objects in NM systems.

SUMMARY

In general, this disclosure describes techniques for managing network devices. In particular, a network management system (NMS) device may be configured to translate high-level configuration (received from an administrator for a plurality of managed network devices) to low-level configuration (to be applied to the managed network devices themselves). In some instances, an administrator may apply an out-of-band change directly to one of the managed network devices. This may render the device "out of synch" with the configuration of the managed network device as maintained by the NMS device, such that the NMS device is not able to correctly manage the network device. Moreover, the managed network device becomes out of synch with other, similar managed network devices in the system. According to the techniques of this disclosure, the NMS device may detect and resolve such changes, e.g., by updating a local version of the configuration of the device at the NMS device, and by applying the change to the other managed network devices based on service mapping rules.

The techniques of this disclosure may enable a "granular level conflict detection" in services from OOB changes. This enables a user to deploy non-conflicting service changes, though some attributes in the service may be out of synch. This disclosure also describes techniques to auto-generate a reverse mapping function for converting low-level configuration changes to high-level configuration changes, and that may be used to reconcile services and discovery. This disclosure also describes techniques to group impacted attributes as a "single operable unit" based on the services' semantics during the reconciliation process. The reconciliation approach proposed may preserve service semantic integrity during conflict resolution. These techniques also may be used to reconcile the service, when the service is expanded through OOB changes. Furthermore, this disclosure describes a recommendation system to suggest automatic resolutions of configuration conflicts.

In one example, a method is performed by a network management system (NMS) device that manages a plurality of network devices. The method includes determining that a low-level configuration of a first network device of the plurality of network devices has been changed by an out-of-band (OOB) change, translating the OOB change to a high-level configuration change, determining whether to apply the high-level configuration change to the plurality of network devices, and in response to determining to apply the high-level configuration change to the plurality of network devices, applying the OOB change to low-level configurations of the plurality of network devices.

In another example, a network management system (NMS) device manages a plurality of network devices. The NMS device includes one or more interfaces to communicatively couple the NMS device to the plurality of network devices, and a processor, implemented using circuitry, configured to determine that a low-level configuration of a first network device of the plurality of network devices has been changed by an out-of-band (OOB) change, translate the OOB change to a high-level configuration change, determine whether to apply the high-level configuration change to the plurality of network devices, and in response to determining to apply the high-level configuration change to the plurality of network devices, apply, via the one or more interfaces, the OOB change to low-level configurations of the plurality of network devices.

In another example, a system includes a plurality of network devices, and a network management system (NMS) device that manages the plurality of network devices. The NMS device includes one or more interfaces to communicatively couple the NMS device to the plurality of network devices, and a processor, implemented using circuitry, configured to determine that a low-level configuration of a first network device of the plurality of network devices has been changed by an out-of-band (OOB) change, translate the OOB change to a high-level configuration change, determine whether to apply the high-level configuration change to the plurality of network devices, and in response to determining to apply the high-level configuration change to the plurality of network devices, apply, via the one or more interfaces, the OOB change to low-level configurations of the plurality of network devices.

In another example, a computer-readable storage medium has stored thereon instructions that, when executed, cause a processor of a network management system (NMS) device that manages a plurality of network devices to determine that a low-level configuration of a first network device of the plurality of network devices has been changed by an out-of-band (OOB) change, translate the OOB change to a high-level configuration change, determine whether to apply the high-level configuration change to the plurality of network devices, and in response to determining to apply the high-level configuration change to the plurality of network devices, apply the OOB change to low-level configurations of the plurality of network devices.

The details of one or more examples are set forth in the accompanying drawings and the description below. Other features, objects, and advantages will be apparent from the description and drawings, and from the claims.

DETAILED DESCRIPTION

Figure 1:
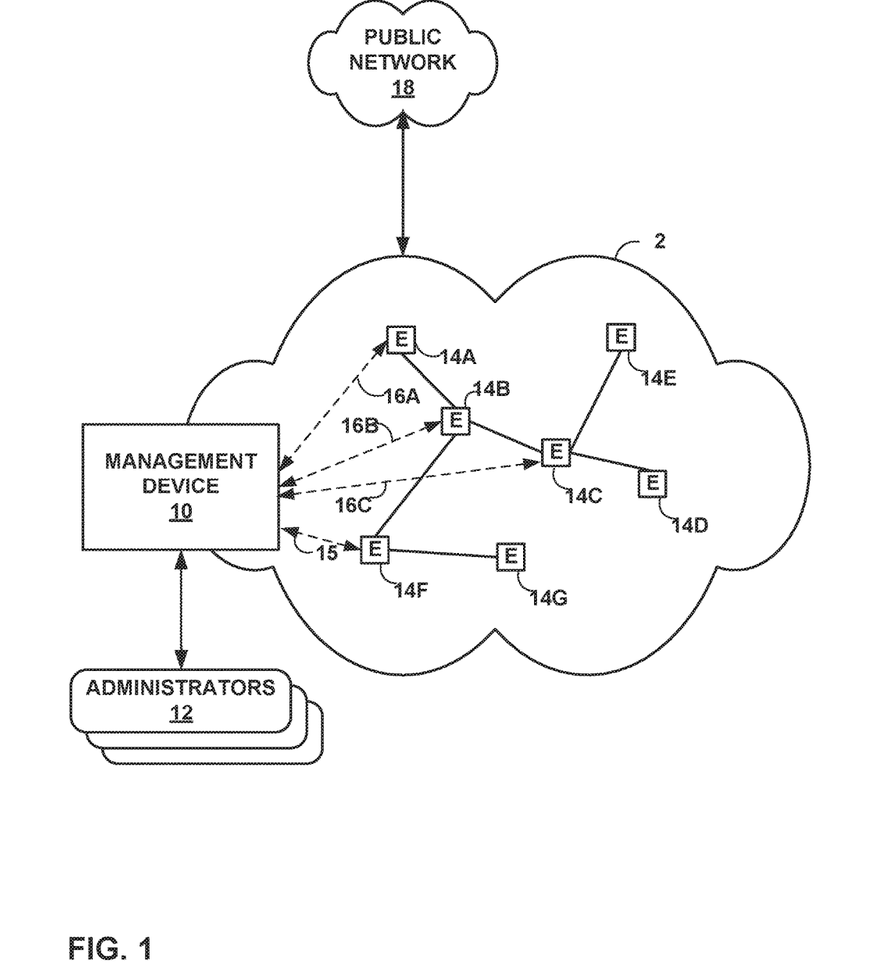
FIG. 1 is a block diagram illustrating an example including elements of an enterprise network that are managed using a management device.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to the various elements 14. Once elements 14 are deployed and activated, administrator 12 uses management device 10 to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS) or NMS device, and elements 14 are centrally maintained by an IT group of the enterprise. Administrator 12 interacts with management device 10 to remotely monitor and configure elements 14. For example, administrator 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using management device 10, to directly configure element 14F. In this manner, a user can provide commands in a format for execution directly to elements 14.

Further, administrator 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrator 12 uses management device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Management device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Management device 10 may establish NETCONF sessions with one or more of elements 14.

Management device 10 may be configured to compare a new set of high-level configuration data to an existing (or old) set of high-level configuration data, and apply the translation functions to the differences between the new and old high-level configuration data. In particular, management device 10 determines whether the new set of configuration data includes any additional configuration parameters relative to the old set of high-level configuration data, as well as whether the new set of configuration data omits any configuration parameters that were included in the old set of high-level configuration data.

Expressed another way, let the number of types of managed devices (e.g., types of elements 14) be represented by N, let the variable y represent low-level, device-specific configuration data, and let the variable x represent high-level configuration data. Management device 10 includes N translation functions $f_1(\ )$, $f_2(\ )$, ... $f_N(\ )$. These functions are configured accept the high-level configuration data (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). The functions are also configured to output respective sets of low-level device configuration data changes, e.g., device configuration additions and removals. That is, $y_1=f_1(x)$, $y_2=f_2(x)$, ... $y_N=f_N(x)$. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference.

Management device 10 may perform service abstraction to capture configurations of elements 14 in the context of the network. Management device 10 may use certain mapping rules between the service layer and the device layer. Management device 10 may follow the mapping rules to reconcile out of band (OOB) changes. Administrators 12 should have a complete understanding of the service and mapping rules to reconcile the OOB changes. This is not easy. The problem becomes even harder for the services that are configured on top of "High level/BSE" services.

Management device 10 may address the following issues when handling OOB changes. That is, initially, management device 10 may determine whether a low-level configuration of one of elements 14 has been changed by an OOB change. Management device 10 may identify any conflicts between the OOB changes and the services in the NMS and mark the impacted service attributes as "out of synch." Management device 10 may also reverse map the OOB configuration difference back to the services in the NMS. Management device 10 may include a recommendation engine to help administrators 12 to resolve the configuration conflicts. Management device 10 may address these issues irrespective of the number of service layers defined in the system.

To address these issues, management device 10 may do the following in response to determining that OOB changes have taken place in one or more of elements 14. First, management device 10 may translate the OOB change to a high-level configuration change. To translate the OOB change, management device 10 may apply reverse mapping functions associated with changes in a low level model (LLM) and determine the impacted service attributes. The LLM may also be referred to as "low-level configuration" for elements 14. Management device 10 may then mark these service attributes as out of synch.

Management device 10 then applies this process recursively to higher layers and marks the corresponding attributes in the upper layer service attributes as out of synch as well. At this stage, management device 10 still allows provisioning of other attributes in the services. When one of administrators 12 starts reconciling changes, management device 10 translates LLM changes to high-level model (HLM) changes and provides accept and reject options to the one of administrators 12. The HLM may also be referred to as high-level configuration. Management device 10 may group the attributes as a single operable unit based on the services' semantics during the reconciliation process. Management device 10 may also suggest the recommendation, while resolving the changes. Thus, management device 10 may determine whether to apply the high-level configuration change to elements 14, and in response to determining to apply the high-level configuration change to elements 14, management device 10 applies the OOB change to low-level configurations of elements 14.

Out of band (OOB) changes include two kinds of changes, e.g., through a command line interface (CLI) or other applications of elements 14, that can bring a service "out of synch" to the network generally. First, a modification to service parameters through the CLI may be an OOB change. Second, expanding a service with more objects may be an OOB change (e.g., adding a new interface to a peer-to-peer (P2P) service).

Elements 14 may provide a CLI by which administrators 12 may provide OOB configuration updates directly to elements 14. A service performed by one or more of elements 14 may have been configured with certain values for properties. These properties can be modified through the CLI. This renders these service properties (or attributes) to be out of synch with the configuration information stored by management device 10.

For example, suppose there were a P2P service with three UNIs interfaces configured with bandwidth of "500." A user (e.g., one of administrators 12), through the CLL could modify the Bandwidth for one interface alone. But the mapping rule for the service in management device 10 could have been used to configure the same bandwidth for all interfaces. This change therefore could not be imported for one interface alone, while maintaining synchronization with elements 14. Accepting the change for this interface should update the bandwidth for interfaces of elements 14.

In some instances, a service offered by elements 14 can be extended with more objects (e.g., interfaces) through the CLI. Though sometimes this change does not conflict with any of the service attributes in management device 10, configuration information stored by management device 10 is not in synch with the configuration of one or more of elements 14. Management device 10 should also detect these changes, and mark the corresponding service attributes as out of synch. At this stage, the service should be allowed to provision. As part of reconciliation, the change should be promoted/rejected/accepted to bring the consistency among management device 10 and elements 14. While promoting these configuration options, management device 10 should make sure the mapping rule integrity is not violated for these additional endpoints (elements 14). This step may lead to the provisioning of additional options to the additional configuration objects.

Figure 2:
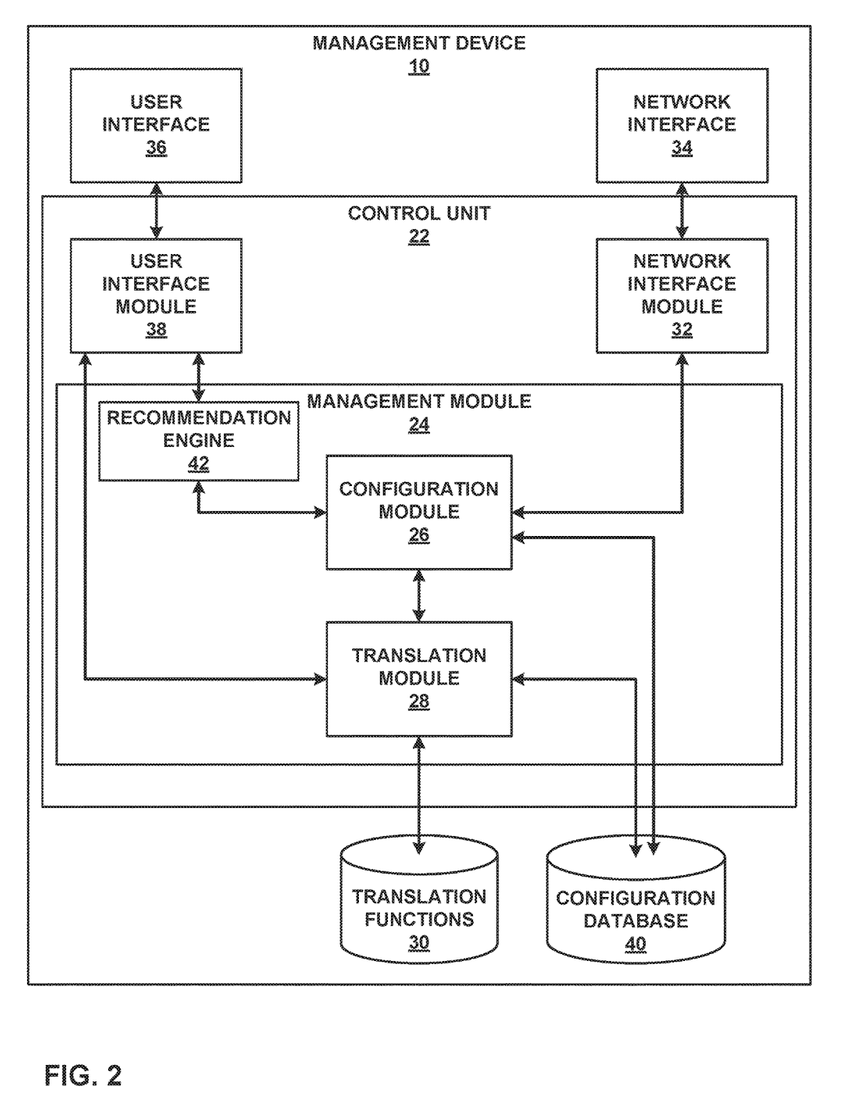
FIG. 2 is a block diagram illustrating an example set of components for the management device of FIG. 1.

FIG. 2 is a block diagram illustrating an example set of components for management device 10 of FIG. 1. In this example, management device 10 includes control unit 22, network interface 34, and user interface 36. Network interface 34 represents an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Management device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with management device 10, e.g., to provide input and receive output. For example, user interface 36 may represent one or more of a monitor, keyboard, mouse, touchscreen, touchpad, trackpad, speakers, camera, microphone, or the like. Furthermore, although in this example management device 10 includes a user interface, it should be understood that administrator 12 need not directly interact with management device 10, but instead may access management device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive high-level configuration instructions for a set of managed network devices from a user, such as administrator 12. Over time, the user may update the configuration instructions, e.g., to add new services, remove existing services, or modify existing services performed by the managed devices. The high-level instructions may be structured according to, e.g., YANG. In some examples, management module 24 also provides the user with the ability to submit translation functions that translation module 28 executes to transform high-level configuration instructions to device-specific, low-level configuration instructions, as discussed below.

Management device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores current configuration information (e.g., high-level configuration information, or in some cases, both high-level configuration and low-level configuration information) for the managed devices (e.g., elements 14).

Translation module 28 determines which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions.

Configuration module 26 may first determine an existing set of high-level configuration information for each service performed by the devices for which configuration is to be updated, e.g., by retrieving the existing set of high-level configuration information for each of the services from configuration database 40. Configuration module 26 may then compare the existing set of high-level configuration information to the newly received set of high-level configuration information, and determine differences between the existing and newly received sets of high-level configuration information. Configuration module 26 may then pass these differences to translation module 28, for translation into respective sets of low-level configuration information. Configuration module 26 also updated the existing high-level configuration information recorded in configuration database 40 based on the newly received set of high-level configuration information.

As discussed above, a user, such as administrator 12, may create different translators for data creation, data updates, and data deletions. This disclosure describes translation techniques based on an appreciation that an "update translator" needs to check modified variables in the high-level configuration information, and update the corresponding configuration in the low-level configuration model(s). When updating the low-level configuration information, the translator should not only rely on the high-level difference data, because unchanged data of the high-level configuration data may need to be read to properly change the low-level configuration data. Thus, the techniques of this disclosure may simplify update and/or delete translators for translating high-level configuration data to low-level configuration data. In some examples, the "create" translator may be used to perform update and/or deletion translations as discussed below.

In some examples, translation functions 30 that perform update translations (that is, translating changes in high-level configuration data that results in updates to values of low-level configuration information, without creation or deletion of elements in the low-level configuration data) may operate as follows. In one example, the translation functions 30 that perform updates may override single elements. That is, performance of these translation functions may result in deletion of an element value, e.g., by replacing an old element value with a new value. Sometimes, a single value in a configuration service model can be mapped to a list in a device configuration. In these cases, translation module 28 may send the old value as well as the new value.

For example, a leaf element in a high-level model (HLM) may be mapped to a list of elements in a low-level model (LLM) for device-level configuration information. Suppose the HLM element has the name "VLAN name" but in LLM, the corresponding element is named "list." If a user modifies the HLM object by replacing the name "VLAN name" with a new name (e.g., "new VLAN name"), the translation function would need to delete "VLAN name," otherwise a stale entry would be retained in the lower-level configuration information. Moreover, translation functions 30 that perform updates may cause translation module 28 to update lists by adding new entries as needed, and deleting old entries.

Translation module 28 (which may be configured according to translation functions 30) may use the same translation template for creation, updates, and deletion of high-level configuration instructions. Translation module 28 may be configured to allow processing of only impacted high level data changes (i.e., those elements in the high-level configuration information that are impacted by the changes). Based on the translator logic, translation module 28 may infer dependencies across HLM elements in the high-level model, and the corresponding LLM elements. When the high-level configuration information is changed, translation module 28 may generate a difference between existing high-level configuration information and new high-level configuration information. This difference may account for the dependencies in the LLM elements. Thus, when calculating the difference, translation module 28 may determine the difference as well as information used to process the difference, e.g., based on the dependencies. Translation module 28 may execute one of translation functions 30, providing the determined information (differences and dependencies) to the executed one of translation functions 30 as input.

When a "create" template is uploaded (that is, a translation function of translation functions 30 that processes new data in high-level configuration information, relative to existing high-level configuration information), translation module 28 may determine the dependencies across elements within the high-level configuration information. These dependencies may be based on service-to-device configuration mappings. When the service is changed, translation module 28 may generate a difference between the existing high-level configuration information and the new high-level configuration information, based on the dependencies. Translation module 28 may then use the "create" template (the translation function of translation functions 30) to process the difference, and thereby translate the high level configuration information to low-level configuration instructions. Translation module 28 may then provide the low-level configuration instructions to configuration module 28.

After receiving the low-level configuration instructions from translation module 28, configuration module 28 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with management device 10, it should be understood that other interfaces may be used in other examples. For example, management device 10 may include a representational state transfer (REST) client (not shown) that may act as an interface to another device, by which administrator 12 may configure management device 10. Likewise, administrator 12 may configure elements 14 by interacting with management device 10 through the REST client.

Management module 24 further includes recommendation engine 42. As explained in greater detail below, recommendation engine 42 may determine whether to provide recommendations to accept or reject HLM changes to, e.g., administrators 12 via user interface 36. Recommendation engine 42 may perform as follows:

1) For each OOB change, the corresponding container/list/choice/case is fetched from the existing configuration in the system and the change is applied. The change is now fed to a recommendation engine.
2) The recommendation engine has one unit, which mentions whether the given change can be accepted or rejected.
3) Also, when the user accepts/rejects a change, the recommendation engine is trained with the configuration segment and the user decision.
4) The recommendation engine is pre-trained and shipped with multiple configurations and misconfigurations.
5) The entire configuration found on the device is split into configuration segments, based on the vendor neutral yang schema. Every module, sub-module, container, list entry and choice case becomes a segment.

Segments are hierarchical, like files and folders. A segment can contain more than one child segments. To accept/reject decision is derived by feeding all its child segments one by one to the recommender as a sequence. Leaf-refs will be resolved during the formation of segments.

6) Sequence to sequence learning with a recurrent neural network is used for the above. The result is a classification, with one output node, which indicates whether the given change can be accepted or rejected.

Figure 3:
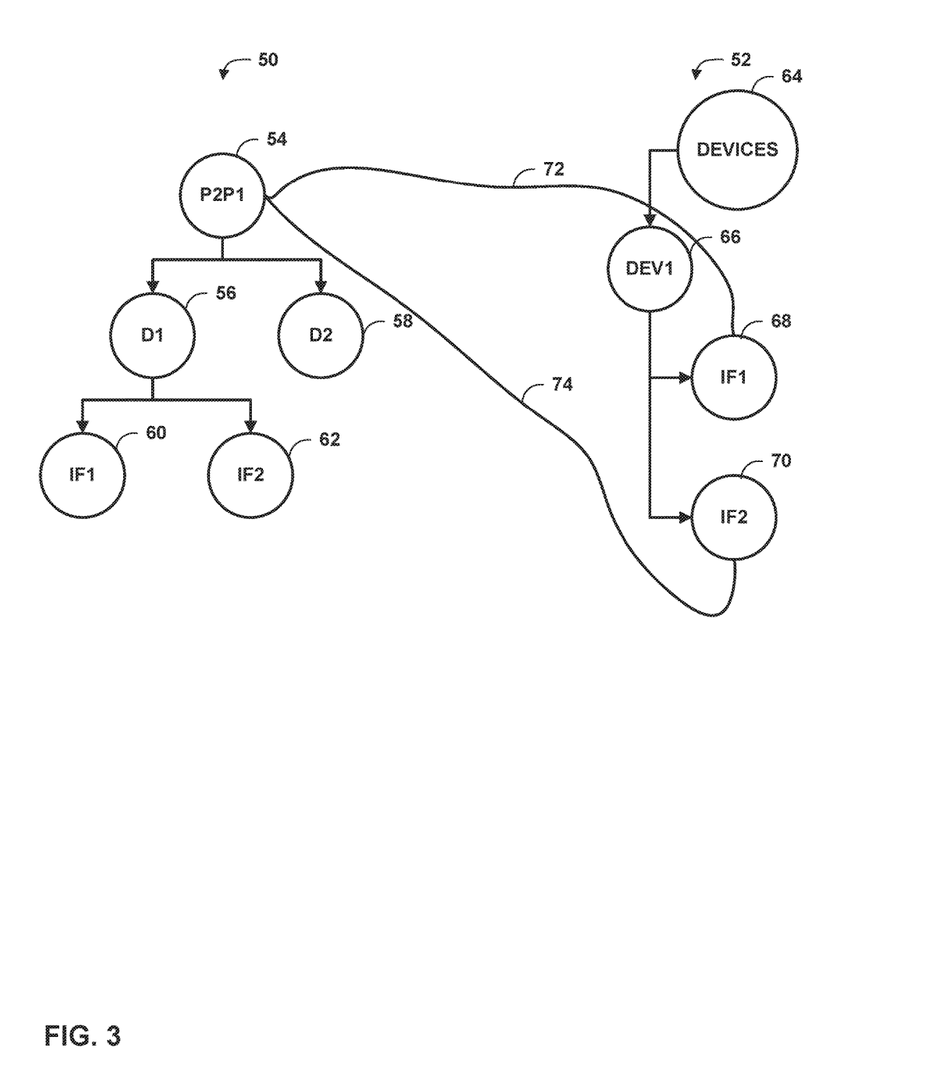
FIG. 3 is a graph illustrating an example high level model and a corresponding low level model, as well as service dependency edges from a vertex of the high level model to vertices of the low level model.

FIG. 3 is a graph illustrating an example high level model 50 and a corresponding low level model 52, as well as service dependency edges 72, 74 from vertex 54 of high level model 52 to vertices 68, 70 of low level model 52. Management device 10 may maintain a database modeled according to a graph based on the example models 50, 52 of FIG. 3 (or other such graphs).

In this example, high level model 50 includes a peer-to-peer ("P2P") vertex labeled "P2P1" 54, device vertices 56, 58 that are child vertices of P2P1 vertex 54 (labeled "D1" and "D2," respectively), and interface vertices 60, 62 that are child vertices of D1 vertex 56 (labeled "IF1" and "IF2," respectively). Low level model 52 includes devices vertex 64. Device vertex 66 (labeled "DEV1") is a child vertex of devices vertex 64. Interface vertices 68, 70 are child vertices of DEV1 vertex 66, and labeled "IF1" and "IF2," respectively. Furthermore, reference edge 72 is shown between P2P1 vertex 54 and IF1 vertex 68, while reference edge 74 is shown between P2P1 vertex 54 and IF2 vertex 70.

Management device 10 may reconcile OOB changes to elements 14 according to high level model 50 and low level model 52. For example, management device 10 may mark service attributes of configuration information of one or more of elements 14 as follows. Initially, HLM to LLM transformation translation rules may be attached as "network functions" to graph vertices 54-70 for a database modeled according to a graph, e.g., the graph of FIG. 3. Management device 10 may generate reverse network functions based on the HLM to LLM transformation function. Additional details for this process are described below.

The database modeled according to the graph (which may be referred to as a configuration graph database) may include service dependency edges as a link type (e.g., for reference edges 72, 74). Management device 10 may create service dependency edges between high-level model service vertices to low level model vertices, as shown in the example of FIG. 3 with reference edges 72, 74. Such edges may be used to navigate back to the service for which the LLM data model was created.

To mark a service attribute as out of synch, management device 10 may perform the following algorithm:

For every OOB change in the Network

Check if any "service dependency edge" is associated to the vertex.

If yes, get the "Reverse Mapped Functions" attached to the watchers on the vertices, which have the modified attributes corresponding to the service.

Apply the "Functions" and generate the "Service Attributes"

Compare the "Service Attributes"

If the "service attributes" are changed

Mark "Service attributes" Out of synch

Follow this recursively to upper layers.

An example set of high level model configuration information is shown below for a P2P service in YANG:

```
module: service
+--rw service* [name]
   +--rw name string
   +--rw connectivity-settings
   |  +--rw name? string
   |  +--rw vc-id? uint32
   |  --rw mtu? uint32
   |  --rw physical-if-encapsulation? string
   |  --rw logical-if-encapsulation? string
   |  --rw traffic-type? string
   |  --rw unit-id? uint32
   |  --rw vlan-id? uint32
   +--rw bandwidth-settings
   |  +--rw bandwidth-limit? uint32
   |  +--rw burstsize-limit? uint32
   +--rw devices
      +-rw device* [device-id]
         +--rw device-id string
         +--rw neighbour-name? string
         +--rw interface* [name]
            +-rw name string
```

An example of corresponding low level model configuration information for the P2P service above is shown below:

```
module: configuration
+-rw configuration
   +--rw interfaces
   |  +--rw interface* [name]
   |  +-rw name string
   |  +-rw flexible-vlan-tagging? empty
   |  +-rw mtu? uint32
   |  +-rw encapsulation? enumeration
   +--rw protocols
      +-rw l2circuit
         +--rw neighbor*
            +-rw name? string
            +-rw interface* [name]
            +--rw name interface-name
            +--rw virtual-circuit-id uint32
            +--rw no-control-word? empty
            +--rw ignore-encapsulation-mismatch? empty
```

As part of the translation, management device 10 may create dependency edges between vertices of the HLM to vertices of the LLM, as shown in FIG. 3. A reverse mapping function attached to an interface may be configured as follows. The reverse mapper function may be associated with every interface (service, devices, device, interface) in the HLM. The function may be triggered based on name, flexible-vlan-tagging, maximum transmission unit (mtu), or encapsulation on the vertex interfaces/interface in LLM. In response, the template below may be triggered:

```
<template>
<Service>
   <connectivity-setting>
      <mtu>{mtu}</mtu>
      <physical-if-encapsulation>{encapsulation}</
         physical-if-encapsulation>
   </connectivity-setting>
   <devices>
      <device>
         <device-id>{device-id}</device-id>
         <interfaces>
            <interface>{name}</interface>
         </interfaces>
      </device>
   </devices>
</Service>
</template>
```

Figure 4:
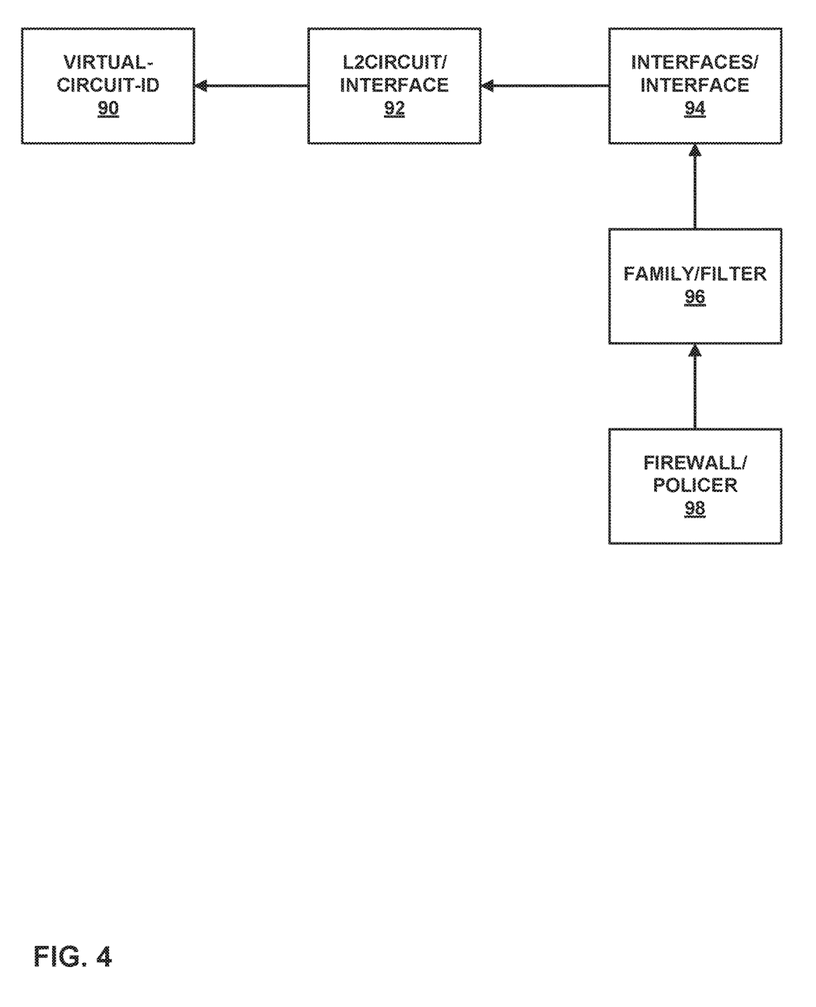
FIG. 4 is a block diagram illustrating an example set of service attributes for a service.

FIG. 4 is a block diagram illustrating an example set of service attributes for a service. In this example, the block diagram represents a dependency graph for a P2P service. In this example, the dependency graph includes virtual circuit ID 90, L2 circuit/interface 92, interfaces/interface 94, family/filter 96, and firewall/policer 98. In some instances, a service may be expanded. When a new service is defined, management device 10 may construct the dependency graph of, e.g., FIG. 3 based on the mappers uploaded. Based on the dependency graph, management device 10 may maintain a list of XPATHs to service type mapping. When there is any change in these XPATHs through OOB, management device 10 may navigate the dependency graph for the changed properties or attributes. If the changed path points to a merge attribute in the dependency graph, management device 10 may mark the corresponding service attributes as out of synch.

In the example of FIG. 4, every node (i.e., nodes 90-98) contains a list of Xpaths, which management device 10 constructs from the HLM to LLM mapper.

Management device 10 may perform the following algorithm to map a service as out of synch:

If there is any change through OOB, Pick the Service types whose dependency graphs has this path.
  For every service type:
    Get the linked element for the changed paths based on Dependency graph.
    If the change leads to Merge attribute, then this change would make the service Out of synch.
    Apply reverse mapping function corresponding to the service, for the newly linked elements in the dependency graph.
    Check for the changes in Service attributes and mark those service attributes Out of synch.

Management device 10 may further reconcile service properties/attributes that are out of synch. In some examples, management device 10 may accumulate configuration changes, so that administrators 12 do not need to resolve out of synch service attributes immediately. From the list of changes, management device 10 may identify the properties that are related. Management device 10 may use the following rules to partition the CLI changes:

1) All the LLM semantic changes should be part of same group. Semantic changes can be identified from the Yang data model. Yang constructs like choice statements, when conditions, if-feature statement, etc. capture the semantic dependencies among the attributes.
2) If the configuration path is leaf referenced, both the changes should be part of same group.

The higher-level service model defines certain mappings on how the service would be defined in the Network. Management device 10 may apply mapping rules to reconcile the OOB changes. While the OOB changes are being accepted, there may be additional changes included based on HLM to bring HLM service integrity. Management device 10 may maintain these changes in a "OOB change draft" dataset, and one of administrators 12 can accept or reject the changes as "single operable unit." An example reconciling algorithm that management device 10 may perform is shown below:

For each change:
  Get the corresponding service instance.
  Reverse map the configuration to the matched Service Change.
  Create a new "OOB change Draft", if no dependent change is present in any of the "OOB change drafts". Else merge this change to dependent "OOB change draft"
  If a service level attribute has different values on two endpoints, keep it as part of the overridden mapping.
  Run validations on the resultant service instance.
  If validation fails, mark the default resolution recommendation as 'Reject' for the modified attribute.
  Else, run the recommendation engine and set the result as the recommendation.

Once the services are synchronized, the conflicting drafts would be synchronized with these changes.

Management device 10 may further automatically generate reverse mapping functions, as discussed above. A developer (e.g., one of administrators 12 or another user) defines mappings from the HLM to the LLM. The LLM represents an abstracted model. The LLM may be translated to a native model through LLM mappings. To support reconciliation, management device 10 may define reverse mappings. Management device 10 may generate the reverse mappings automatically from corresponding forward mappings. Management device 10 may use the reverse mappings to translate LLM changes to HLM changes.

The following is an example forward mapping for translating the P2P HLM above to the corresponding LLM above:

```
<template>
  <device>
    <device-id>{/service/devices/device/device-id}</device-id>
    <configuration>
      <interfaces loop-context="interface">
        <interface>
          <name>{name}</name>
          <flexible-vlan-tagging/>
          <mtu>{/service/connectivity-settings/mtu}</mtu>
          <encapsulation>{/service/connectivity-settings/physical-if-encapsulation}</encapsulation>
        </interface>
      </interfaces>
      <protocols>
        <l2circuit>
          <neighbor>
            <name>{neighbour-name}</name>
            <interface loop-context="interface">
              <name>{name}</name>
              <virtual-circuit-id>{/service/connectivity-settings/vc-id}</virtual-circuit-id>
              <no-control-word/>
              <ignore-encapsulation-mismatch/>
            </interface>
          </neighbor>
        </l2circuit>
      </protocols>
    </configuration>
  </device>
</template>
```

Management device 10 may generate the reverse mapping below from the above forward mapping. Management device 10 may then use this reverse mapping during service discovery.

```
<template>
  <service>
    <connectivity-settings>
      <mtu>{interfaces/interface/mtu}</mtu>
```

```
        <physical-if-encapsulation>{interfaces/interface/en-
            capsulation}</physical-if-encapsulation>
        <vc-id>{protocols/l2circuit/neighbor/interface/vir-
            tual-circuit-id}</vc-id>
        <neighbour-name>protocols/l2circuit/neighbor/
            name</neighbour-name>
    </connectivity-settings>
    <devices>
        <device>
            <device-id>{device-id}</device-id>
            <interfaces loop-context="interfaces/interface">
                <interface>{name}</interface>
            </interfaces>
        </device>
    </devices>
</service>
</template>
```

From the above template, management device 10 may derive the transformation functions below. Furthermore, management device 10 may execute a service vertex function. The reverse mapping above may be associated with the following triggering actions: interface-encapsulation, mtu, and protocols/l2circuit/neighbor/interface/virtual-circuit-id, protocols/l2circuit/neighbor/name. In response to one or more of these triggering actions, management device 10 may execute the following template:

```
<template>
<service>
    <connectivity-settings>
        <mtu>{(interfaces/interface/mtu}<mtu>
        <physical-if-encapsulation>{interfaces/interface/en-
            capsulation}</physical-if-encapsulation>
        <vc-id>{protocols/l2circuit/neighbor/interface/vir-
            tual-circuit-id}</vc-id>
        <neighbour-name>protocols/l2circuit/neighbor/
            name</neighbour-name>
    </connectivity-settings>
</template>
```

Management device 10 may also execute a device vertex function. The device vertex function may be associated with an interfaces/interface/name trigger. In response to this trigger, management device 10 may execute the following template:

```
<template>
<devices>
<device>
    <device-id>{device-id}</device-id>
    <interfaces>
        <interface>{name}</interface>
    </interfaces>
</device>
</devices>
</service>
</template>
```

There can be scenarios where a service abstract model will not be directly mapped to the LLM. There may be business logic required for transformations. For example, if the HLM contains a priority field, which accepts enumerations of high, medium, and low, this may be translated to certain values for a bandwidth field and buffer size values in the LLM based on the priority in the HLM. This mapping can be defined as a custom function. Along with the custom function, developers may provide the reverse mapping functions, which would be used to generate the HLM value from the LLM value. For the built-in functions, management device 10 may automatically generate reverse mapping functions.

Figure 5:
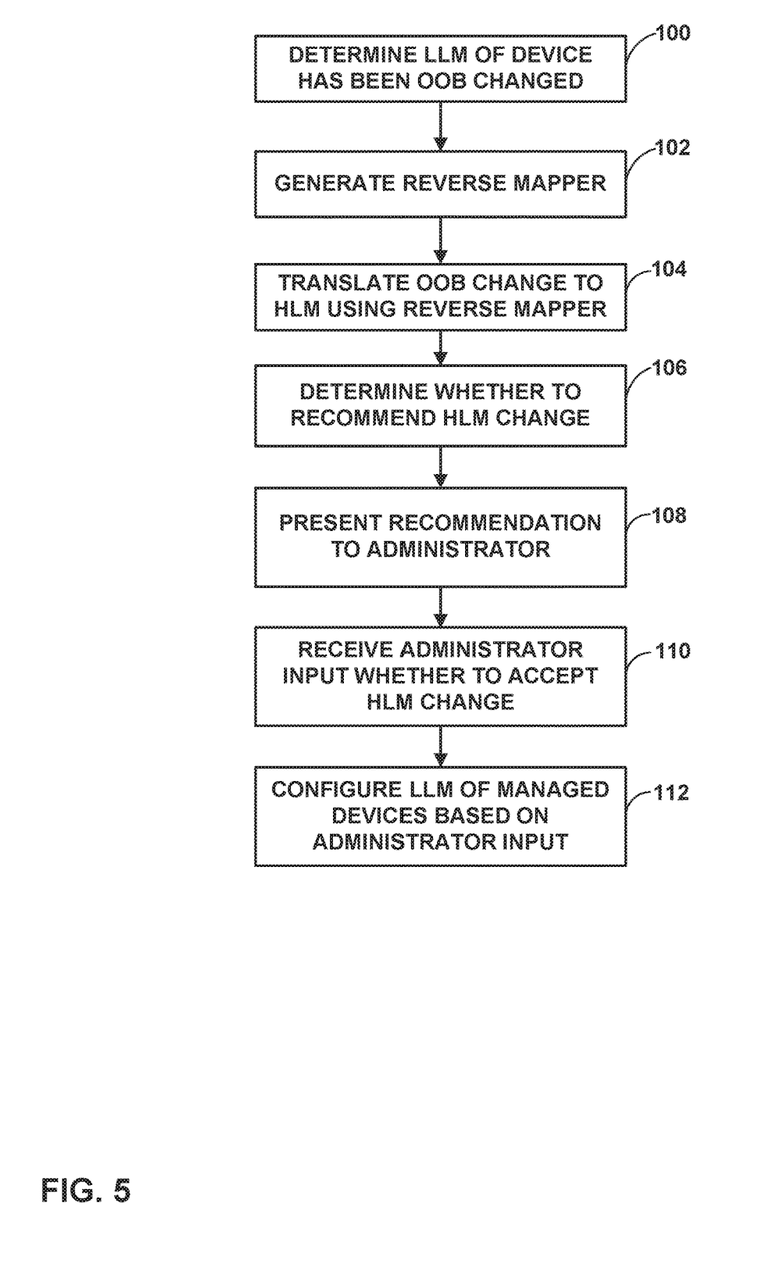
FIG. 5 is a flowchart illustrating an example method in accordance with the techniques of this disclosure.

FIG. 5 is a flowchart illustrating an example method in accordance with the techniques of this disclosure. For purposes of example and explanation, the method of FIG. 5 is explained as being performed by management device 10.

Initially, management device 10 (e.g., management module 24, executed by control unit 22) may determine that the LLM of one of elements 14 (that is, a managed network device) has been changed by an OOB change (100). Management device 10 may generate a reverse mapping function (102) from a forward mapping function as explained above, and use the reverse mapping function to translate the OOB change to an HLM change (104). Although in the example of FIG. 5 generation of the reverse mapping function follows detection of the OOB change to the LLM, it should be understood that in other examples, management device 10 may generate the reverse mapping function at a different time, e.g., prior to detecting the OOB change.

In this manner, the method of FIG. 5 includes determining that a low-level configuration of a first network device of the plurality of network devices has been changed by an out-of-band (OOB) change and translating the OOB change to a high-level configuration change. In particular, translating the OOB change may include applying a reverse mapping function to the OOB change, the reverse mapping function corresponding to a reverse of a mapping function used to translate high-level configuration information to low-level configuration information for the plurality of network devices. Moreover, the method may include generating the reverse mapping function from the corresponding mapping function.

Recommendation engine 42 of management device 10 may further automatically determine whether to recommend the HLM change (106) and present the recommendation to one of administrators 12 (108). For example, recommendation engine 42 may determine whether the HLM change conflicts with existing HLM configuration for elements 14, and when the HLM change does not conflict with the existing HLM configuration, recommend applying the HLM change. In response to the recommendation, management device 10 may receive input from the administrator of whether to accept the HLM change (110). In this manner, the method of FIG. 5 includes providing a recommendation to an administrator to apply the high-level configuration change to the plurality of network devices, and receiving, from the administrator, an indication that the recommendation is accepted.

In response to the administrator's input, management device 10 may configure the LLM of elements 14 (that is, managed devices) based on the administrator's input (112). For example, in response to determining to apply the high-level configuration change to the plurality of network devices based on input from the administrator indicating that the high-level configuration change is to be applied, management device 10 may apply the OOB change to low-level configurations of elements 14.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising, by a network management system (NMS) device that manages a plurality of network devices:
   determining that a low-level configuration of a first network device of the plurality of network devices has been changed by an out-of-band (OOB) change, wherein the OOB change comprises a change applied directly to the low-level configuration of the first network device, the low-level configuration comprising configuration data according to which the first network device performs one or more network services;
   translating the OOB change to a high-level configuration change;
   determining whether to apply the high-level configuration change to the plurality of network devices other than the first network device; and
   in response to determining to apply the high-level configuration change to the plurality of network devices other than the first network device, applying the OOB change to low-level configurations of the plurality of network devices other than the first network device.

2. The method of claim 1, wherein translating comprises applying a reverse mapping function to the OOB change, the reverse mapping function corresponding to a reverse of a mapping function used to translate high-level configuration information to low-level configuration information for the plurality of network devices.

3. The method of claim 2, further comprising generating the reverse mapping function from the corresponding mapping function.

4. The method of claim 1, wherein determining whether to apply the high-level configuration change to the plurality of network devices other than the first network device comprises:
   providing a recommendation to an administrator to apply the high-level configuration change to the plurality of network devices other than the first network device; and
   receiving, from the administrator, an indication that the recommendation is accepted.

5. The method of claim 4, wherein providing the recommendation comprises:
   determining that the high-level configuration change does not conflict with existing high-level configuration for the plurality of network devices; and
   based on the determination that the high-level configuration change does not conflict with the existing high-level configuration, providing the recommendation to the administrator to apply the high-level configuration change.

6. The method of claim 1, wherein determining that the low-level configuration of the first network device of the plurality of network devices has been changed by the OOB change comprises detecting a granular level conflict in the low-level configuration for a service provided by the first network device.

7. The method of claim 1, wherein applying the OOB change comprises grouping a plurality of attributes impacted by the low-level configuration change as a single operable unit based on semantics for a service impacted by the low-level configuration change during a reconciliation process.

8. The method of claim 1, wherein applying the OOB change comprises providing service semantic integrity during conflict resolution.

9. The method of claim 1, wherein applying the OOB change comprises, when a service provided by the first network device is expanded by the OOB change, reconciling the service based on the OOB change.

10. A network management system (NMS) device that manages a plurality of network devices, the NMS device comprising:
   one or more interfaces to communicatively couple the NMS device to the plurality of network devices; and
   a processor, implemented using circuitry, configured to:
      determine that a low-level configuration of a first network device of the plurality of network devices has been changed by an out-of-band (OOB) change, wherein the OOB change comprises a change applied directly to the low-level configuration of the first network device, the low-level configuration comprising configuration data according to which the first network device performs one or more network services;
      translate the OOB change to a high-level configuration change;
      determine whether to apply the high-level configuration change to the plurality of network devices other than the first network device; and
      in response to determining to apply the high-level configuration change to the plurality of network devices other than the first network device, apply, via the one or more interfaces, the OOB change to low-level configurations of the plurality of network devices other than the first network device.

11. The NMS device of claim 10, wherein to translate the OOB change, the processor is configured to apply a reverse mapping function to the OOB change, the reverse mapping function corresponding to a reverse of a mapping function used to translate high-level configuration information to low-level configuration information for the plurality of network devices.

12. The NMS device of claim 11, wherein the processor is further configured to generate the reverse mapping function from the corresponding mapping function.

13. The NMS device of claim 10, further comprising one or more user interfaces, wherein to determine whether to apply the high-level configuration change to the plurality of network devices other than the first network device, the processor is configured to:
provide, via the user interfaces, a recommendation to an administrator to apply the high-level configuration change to the plurality of network devices other than the first network device; and
receive, from the administrator via the user interfaces, an indication that the recommendation is accepted.

14. The NMS device of claim 13, wherein to provide the recommendation, the processor is configured to:
determine that the high-level configuration change does not conflict with existing high-level configuration for the plurality of network devices; and
based on the determination that the high-level configuration change does not conflict with the existing high-level configuration, provide the recommendation to the administrator to apply the high-level configuration change.

15. The NMS device of claim 10, wherein the processor is further configured to detect a granular level conflict in the low-level configuration for a service provided by the first network device from the OOB change.

16. The NMS device of claim 10, wherein to apply the OOB change, the processor is configured to group a plurality of attributes impacted by the low-level configuration change as a single operable unit based on semantics for a service impacted by the low-level configuration change during a reconciliation process.

17. The NMS device of claim 10, wherein to apply the OOB change, the processor is configured to provide service semantic integrity during conflict resolution.

18. The NMS device of claim 10, wherein to apply the OOB change, the processor is configured to, when a service provided by the first network device is expanded by the OOB change, reconcile the service based on the OOB change.

19. A system comprising:
a plurality of network devices; and
a network management system (NMS) device that manages the plurality of network devices, the NMS device comprising:
one or more interfaces to communicatively couple the NMS device to the plurality of network devices; and
a processor, implemented using circuitry, configured to:
determine that a low-level configuration of a first network device of the plurality of network devices has been changed by an out-of-band (OOB) change, wherein the OOB change comprises a change applied directly to the low-level configuration of the first network device, the low-level configuration comprising configuration data according to which the first network device performs one or more network services;
translate the OOB change to a high-level configuration change;
determine whether to apply the high-level configuration change to the plurality of network devices other than the first network device; and
in response to determining to apply the high-level configuration change to the plurality of network devices other than the first network device, apply, via the one or more interfaces, the OOB change to low-level configurations of the plurality of network devices other than the first network device.

20. The system of claim 19, wherein to translate the OOB change, the processor of the NMS device is configured to apply a reverse mapping function to the OOB change, the reverse mapping function corresponding to a reverse of a mapping function used to translate high-level configuration information to low-level configuration information for the plurality of network devices.

21. The system of claim 20, wherein the processor of the NMS device is further configured to generate the reverse mapping function from the corresponding mapping function.

22. The system of claim 19, further comprising one or more user interfaces, wherein to determine whether to apply the high-level configuration change to the plurality of network devices other than the first network device, the processor of the NMS device is configured to:
provide, via the user interfaces, a recommendation to an administrator to apply the high-level configuration change to the plurality of network devices other than the first network device; and
receive, from the administrator via the user interfaces, an indication that the recommendation is accepted.

23. The system of claim 22, wherein to provide the recommendation, the processor of the NMS device is configured to:
determine that the high-level configuration change does not conflict with existing high-level configuration for the plurality of network devices; and
based on the determination that the high-level configuration change does not conflict with the existing high-level configuration, provide the recommendation to the administrator to apply the high-level configuration change.

24. The system of claim 19, wherein the processor of the NMS device is further configured to detect a granular level conflict in the low-level configuration for a service provided by the first network device from the OOB change.

25. The system of claim 19, wherein to apply the OOB change, the processor of the NMS device is configured to group a plurality of attributes impacted by the low-level configuration change as a single operable unit based on semantics for a service impacted by the low-level configuration change during a reconciliation process.

26. The system of claim 19, wherein to apply the OOB change, the processor of the NMS device is configured to provide service semantic integrity during conflict resolution.

27. The system of claim 19, wherein to apply the OOB change, the processor of the NMS device is configured to, when a service provided by the first network device is expanded by the OOB change, reconcile the service based on the OOB change.

28. A computer-readable storage medium comprising instructions that, when executed, cause a processor of a network management system (NMS) device that manages a plurality of network devices to:

determine that a low-level configuration of a first network device of the plurality of network devices has been changed by an out-of-band (OOB) change, wherein the OOB change comprises a change applied directly to the low-level configuration of the first network device, the low-level configuration comprising configuration data according to which the first network device performs one or more network services;

translate the OOB change to a high-level configuration change;

determine whether to apply the high-level configuration change to the plurality of network devices other than the first network device; and in response to determining to apply the high-level configuration change to the plurality of network devices other than the first network device, apply the OOB change to low-level configurations of the plurality of network devices other than the first network device.

29. The computer-readable storage medium of claim 28, wherein the instructions that cause the processor to translate the OOB change comprise instructions that cause the processor to apply a reverse mapping function to the OOB change, the reverse mapping function corresponding to a reverse of a mapping function used to translate high-level configuration information to low-level configuration information for the plurality of network devices.

30. The computer-readable storage medium of claim 29, further comprising instructions that cause the processor to generate the reverse mapping function from the corresponding mapping function.

31. The computer-readable storage medium of claim 28, wherein the instructions that cause the processor to determine whether to apply the high-level configuration change to the plurality of network devices other than the first network device comprise instructions that cause the processor to:

provide a recommendation to an administrator to apply the high-level configuration change to the plurality of network devices other than the first network device; and receive, from the administrator, an indication that the recommendation is accepted.

32. The computer-readable storage medium of claim 31, wherein the instructions that cause the processor to provide the recommendation comprise instructions that cause the processor to:

determine that the high-level configuration change does not conflict with existing high-level configuration for the plurality of network devices; and based on the determination that the high-level configuration change does not conflict with the existing high-level configuration, provide the recommendation to the administrator to apply the high-level configuration change.

33. The computer-readable storage medium of claim 28, wherein the instructions that cause the processor to determine that the low-level configuration of the first network device of the plurality of network devices has been changed by the OOB change comprise instructions that cause the processor to detect a granular level conflict in the low-level configuration for a service provided by the first network device.

34. The computer-readable storage medium of claim 28, wherein the instructions that cause the processor to apply the OOB change comprise instructions that cause the processor to group a plurality of attributes impacted by the low-level configuration change as a single operable unit based on semantics for a service impacted by the low-level configuration change during a reconciliation process.

35. The computer-readable storage medium of claim 28, wherein the instructions that cause the processor to apply the OOB change comprise instructions that cause the processor to provide service semantic integrity during conflict resolution.

36. The computer-readable storage medium of claim 28, wherein the instructions that cause the processor to apply the OOB change comprise instructions that cause the processor to, when a service provided by the first network device is expanded by the OOB change, reconcile the service based on the OOB change.

* * * * *